May 24, 1955
P. H. TAYLOR
2,708,908
RECIPROCABLE LIQUID SPRING
Filed July 29, 1954
2 Sheets-Sheet 1
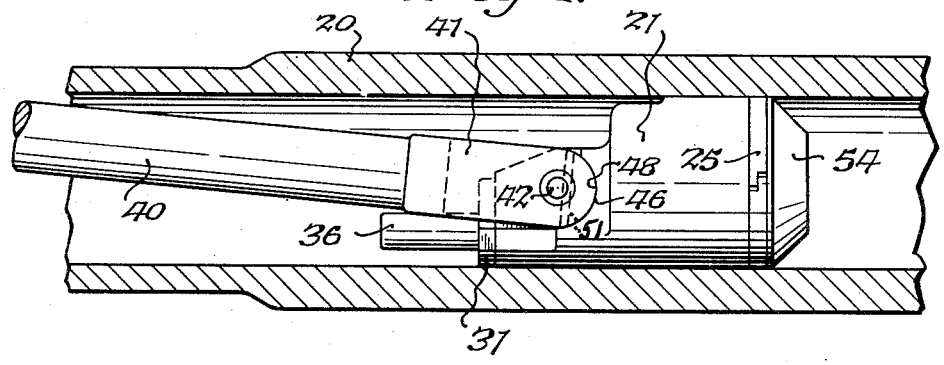
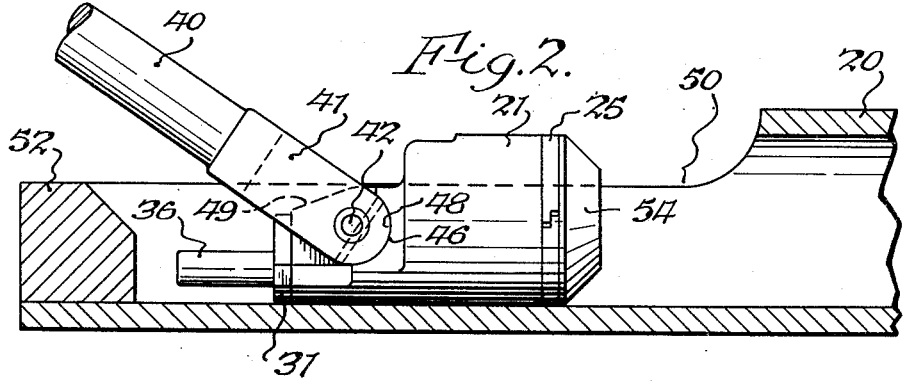
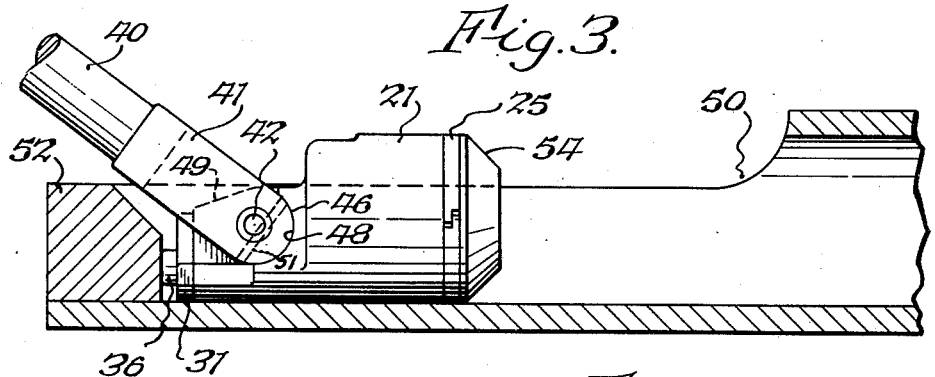
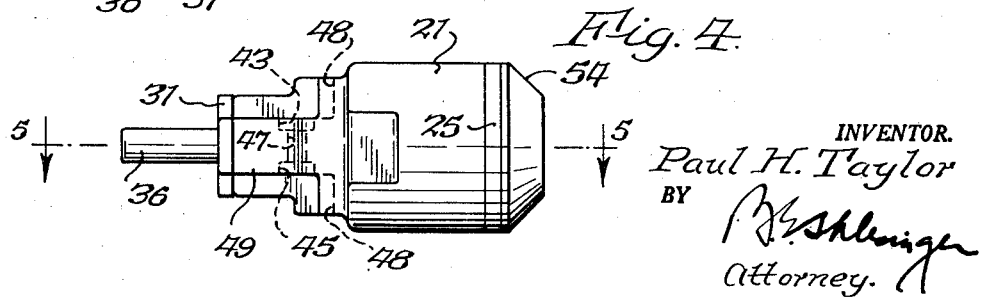
INVENTOR.
Paul H. Taylor
BY
Attorney.

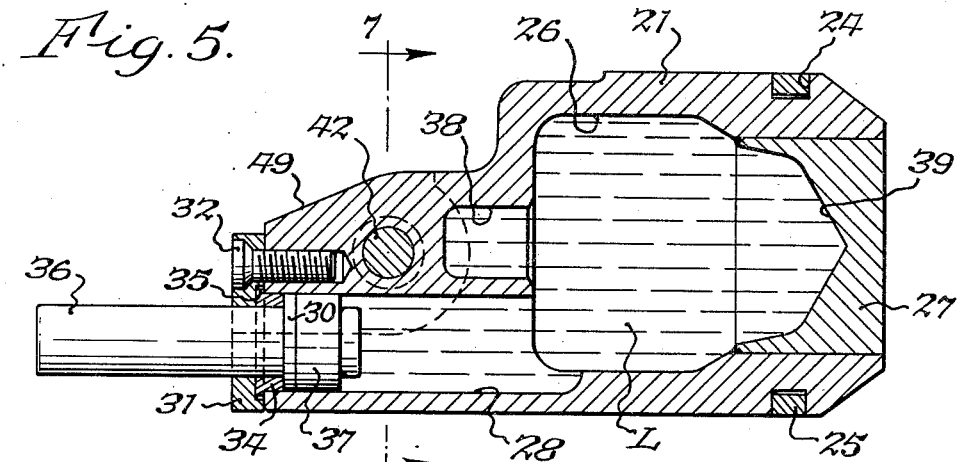
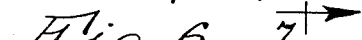
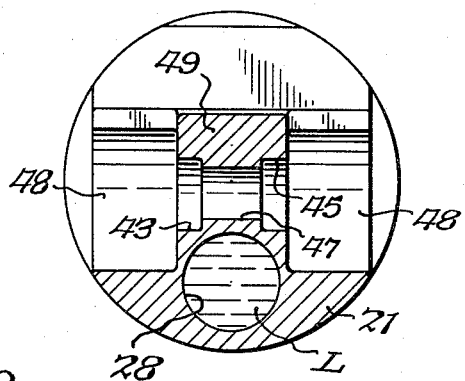
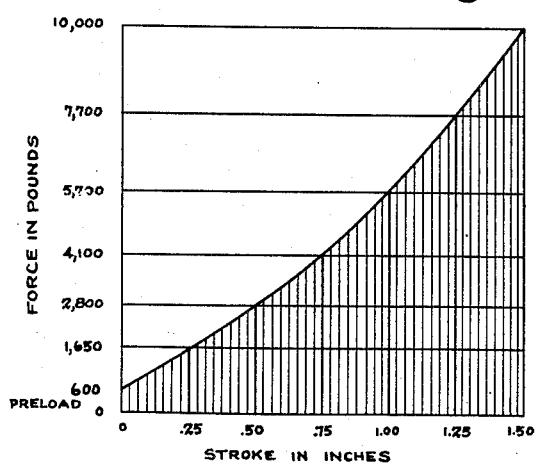
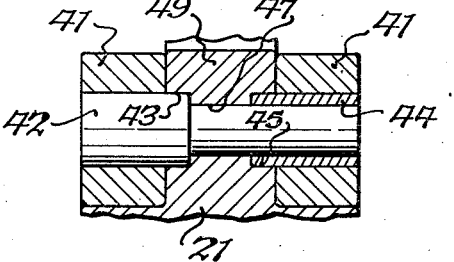

United States Patent Office 2,708,908
Patented May 24, 1955

2,708,908
RECIPROCABLE LIQUID SPRING

Paul H. Taylor, Grand Island, N. Y., assignor to Wales-Strippit Corporation, North Tonawanda, N. Y., a corporation of New York Application July 29, 1954, Serial No. 446,451

16 Claims. (Cl. 121—38)

The present invention relates to liquid spring devices and more particularly to liquid springs which form an integral part of another device or structure.

The conventional liquid spring comprises a container having a chamber filled with a compressible liquid, a guide cylinder communicating with said chamber and also filled with said liquid, and a piston reciprocably mounted in said cylinder. Heretofore, liquid springs have been used between two relatively movable parts, the container being connected to one of these parts, and the piston being connected to the other. When a force or load is applied to one of the two relatively movable parts, the piston is forced inwardly of the container, compressing the liquid in the container. When the force or load is relieved, the liquid expands, returning the piston, and the part, to which is connected, to its initial position.

In previous applications of liquid springs, therefore, the compression of the liquid begins as soon as one of the parts, to which one element of the spring is connected, begins to move relative to the part to which the other element of the spring is connected. In these previous applications of liquid springs, moreover, the spring was a resilient unit in itself; and if used with another device was installed as a unit therein; it was not integrated into the structure of the device with which it was used.

Liquid springs have come more and more into use in applications where heretofore mechanical springs, such as coil or leaf springs, have been used, and in applications where mechanical springs could not be used because of their physical limitations. In a liquid spring only a light-weight piston is accelerated when the spring is actuated, whereas in a mechanical spring, the entire mass of the spring is moved to some degree each cycle so that the natural frequency of a liquid spring is much higher than a coil spring, enabling it to be operated at much higher velocities. A liquid spring is much more compact and much smaller than a mechanical spring which will carry the equivalent load. Conversely, a liquid spring of a given size will carry many times the load of the same size mechanical spring. In fact, in many instances a liquid spring is the only practical spring for a given job.

A primary object of the present invention is to provide a new type liquid spring which will widen the field of use of liquid springs, which, in fact, will enable liquid springs to be used in applications where they have heretofore not been used.

A further object of the invention is to provide a liquid spring which will satisfactorily perform under conditions where a mechanical spring will not meet the situation.

For instance, in a jet powered fighter bomber airplane the fuel consumption is so large that it is customary to carry auxiliary fuel tanks beneath the wings of the plane. In one conventional design of jet fighter bomber the auxiliary fuel tanks used are each 21 feet long and 2½ feet in diameter, and weigh 3400 pounds when full, and 200 pounds when empty. One of these fuel tanks is hung under each wing. One of the problems with these airplanes is that of jettisoning these auxiliary fuel tanks. When the enemy is sighted, these tanks are dropped immediately because due to their weight and size they reduce the speed and maneuverability of the airplane. These airplanes travel so fast that there is difficulty in throwing the fuel tanks clear of the airplane quickly enough. Several disasters have occurred where the airplane catches up with the discarded fuel tank; and the tank crashes into a wing or the fuselage, costing not only the loss of an airplane but the life of its trained pilot. The same problem occurs with reference to dropping bombs. At times the bomb rack does not throw the bomb clear of the plane fast enough to prevent the plane itself from crashing into its own bomb.

Various explosive-actuated mechanisms have been used in an effort to throw stores, such as fuel tanks and bombs, clear of an aeroplane, but these mechanisms have heretofore not been satisfactory in practice because of the variations in weight of the stores. Thus, a full gasoline tank weighs considerably more than an empty tank. Hence, because the explosive force input is the same regardless of whether the tank is full or empty, a great deal of energy has heretofore been left over after ejection of an empty tank. This has heretofore had to be absorbed by the aircraft structure. This has required an increase in weight of the aircraft; and the weight penalty is such as to prohibit use of the previous explosive-actuated mechanisms.

One object of the present invention is to provide a liquid spring adapted for use in ejecting mechanisms, such as used in airplanes for jettisoning gas tanks, ejecting bombs, etc., which can absorb the left-over energy when ejecting an empty auxiliary gas tank.

Another object of the invention is to provide a liquid spring for use in ejectors for auxiliary gas tanks on airplanes, in bomb racks, etc., which can return almost instantaneously the ejecting arm or other mechanism after it has performed its ejecting movement.

Another object of this invention is to provide a spring in combination with a reciprocable piston, which spring has no natural frequencies and can therefore operate at the velocity of an explosive-actuated projectile.

Another object of the invention is to provide a liquid spring that is freely movable bodily within predetermined limits and which will operate only after it has been moved bodily a predetermined distance.

Another object of the present invention is to provide a propelled liquid spring which is bodily movable under some external propelling power, and through its bodily movement effects during its stroke in one direction a desired operation, and which at the end of its stroke is compressed, so that when the propelling power is released, the spring will return to initial position.

Another object of the invention is to provide a liquid spring which may act as a lost-motion device in the sense that it requires to be moved bodily some distance before it is energized.

Another object of the invention is to provide a liquid spring in the form of a first piston movable in a cylinder where the cylinder itself constitutes a second piston that is movable in a second cylinder or guide.

Another object of the invention is to provide a liquid spring which may be combined with or integrated with the device with which it is to be used so that energy may be stored in and returned to the device without appreciably increasing the weight of the device.

Another object of the invention is to provide a combined liquid spring and piston having but a fraction of the weight of mechanical spring and piston combination.

Other objects of the invention will be apparent hereinafter from the specification and from the recital of the appended claims.

In the drawings:

Fig. 1 is a fragmentary axial section of the barrel or cylinder of a free piston engine, and more specifically a gasoline tank ejecting mechanism, constructed according to the present invention, a combined piston and liquid spring being shown reciprocably mounted therein and connected to the connecting rod of the ejector;

Fig. 2 is another fragmentary axial section of the barrel taken adjacent one end thereof, and showing the liquid spring-piston approaching the end of its working stroke;

Fig. 3 shows the same section of the barrel as Fig. 2, but with the liquid spring-piston at the end of its stroke and under compression;

Fig. 4 is a plan view of the liquid spring-piston;

Fig. 5 is a section on an enlarged scale on the line 5—5 of Fig. 4 looking in the direction of the arrows;

Fig. 6 is an end view of one end of the liquid spring-piston, with the connecting rod and connecting pin removed;

Fig. 7 is a section on the line 7—7 of Fig. 5 looking in the direction of the arrows, and again with the connecting rod and connecting pin removed;

Fig. 8 is a fragmentary section on the same line as Fig. 7 but showing the connecting rod connected to the main piston of the spring-piston; and Fig. 9 is a graph showing the relation of the stroke of the spring-piston to the force exerted in pounds.

Referring now to the drawings by numerals of reference, 20 denotes the barrel of a free piston engine which in this instance is the barrel of an ejecting mechanism such as may be employed on a jet fighter bomber for ejecting one of its auxiliary fuel tanks. In practice, this barrel may be similar to a gun barrel except that it is not rifled. Mounted to reciprocate in the barrel 20 is a piston 21 which has a smooth, cylindrical outside surface to fit closely into the barrel, and which may be grooved, as denoted at 24 (Fig. 5) to hold a conventional split piston ring 25 (Fig. 1) for sealing.

The piston or projectile 21 is hollowed out to provide a chamber 26 (Fig. 5) which is closed at one end by an end plug 27 that is welded or brazed in place. The piston body 21 is also formed with a cylinder 28 that communicates with the chamber 26. A plunger or piston 30 is mounted to reciprocate in the cylinder 28. An end plate 31 closes the outer end of the cylinder 28. This end plate is of general T-shape in end view, as shown in Fig. 6. It is adapted to be secured in position by three screws 32 that thread into the piston body 21. The end plate 31 also serves to secure in position a combined stop and guide collar 34. This stop 34 has a flange 35 that abuts against the left hand end of the piston body and that is held between the end plate 31 and the left hand end of the piston body. The plunger or piston 30 has a rod or portion 36 of reduced diameter that projects outwardly from the piston and is integral or rigid therewith. The rod 36 extends through stop collar 34 and is supported and guided thereby.

The piston 30 itself may be of conventional construction, such as ordinarily used in liquid springs, and may carry a conventional seal 37 for preventing leakage along the piston in its reciprocating movement.

The cylinder 28 and chamber 26 are adapted to be filled with a compressible liquid L. To increase the amount of liquid that may be contained in the piston body 21, and therefore to increase the force or load which the piston body may carry, the piston body may be further hollowed out as denoted at 38, and the plug 27 may also be hollowed out as denoted at 39; and the whole of the space, comprising the cylinder 28, chamber 26, and the hollowed out portions 38 and 39, is filled with the compressible liquid L. Since energy absorption is directly proportional to the volume of liquid compressed, this additional volume of liquid permits more work to be done.

The piston itself is connected to the ejecting mechanism, which may otherwise be of conventional construction, by a connecting rod 40. The rod 40 is furcated being formed with spaced ears 41 which straddle the portion 49 of the piston body 21. It is connected to the piston body by a pin 42. As best shown in Fig. 8 the pin 42 passes through one of the furcations 41 in the connecting rod and into portion 49 of piston body 21, and then is reduced in diameter, and extends into a bushing 44, which has a pressed fit in the other furcation 41 and in the adjacent portion of the piston body. The head of the pin 42 fits into a counterbore 43 (Fig. 7) in the piston body 21; and the bushing 44 fits into a similar counterbore 45 in the piston body, while the stem portion of the pin itself extends through the bore 47 in the piston body. A pin 51, shown dotted in Figs. 1 to 3, may be pressfit into one of the furcations 41 to secure the pin 42 in position. Pin 51 engages in a half round recess in pin 42.

One of the most important features of the construction is that the furcations 41 are rounded at their ends, that is, on parts of their peripheries, as denoted at 46 in Fig. 2, and these rounded portions of the furcations fit into corresponding arcuately curved sockets 48 (Figs. 6 and 7) in the piston body 21. Through the furcations, therefore, the connecting rod 40 has a half-shoe connection to the piston body 21. This half-shoe connection transmits from the connecting rod to the piston the explosive force actuating the ejecting mechanism which may amount to 125,000 lbs. per square inch; and it does this without a heavy wrist pin, thereby providing space for cylinder 28 and piston 30. This connection makes the device practical as without it there would be no space for piston 30. This connection also helps absorb shocks, preventing scoring of the barrel 20. The rounded portions 46 of the furcations and of the sockets 48 are concentric with the axis of the connecting pin 42 which operates for the smaller tension loads only.

The barrel 20 has an axial slot in it adjacent its left hand end, as denoted at 50. The connecting rod 40 extends through this slot to the ejecting mechanism proper which may be of conventional construction. A stop 52 is secured in the left hand end of the barrel.

For purposes of explanation, the functions of my device are described in connection with its use in an ejecting mechanism. In such use, the powder or other propellant for the piston 21, which is here in effect a missile, may be ignited directly in the right hand end of the bore of the barrel 20. In practice, however, the powder or other propellant is exploded in a barrel communicating with the barrel 20. The explosive force drives the piston body from right to left, as shown in Figs. 1, 2 and 3. The connecting rod 40 forms part of a toggle mechanism or other suitable linkage for swinging the gasoline tank carrier or the bomb rack, as the case may be, about a pivot on the airplane. Since this is a fixed pivot, the inclination of the connecting rod to the path of travel of the piston body or missile 21 increases as the piston body or missile moves to the left, as shown in Figs. 1, 2 and 3. At the end of its travel, the rod 36 of the plunger or piston 34 strikes the stop 52, and the liquid L in the piston body 21 is compressed. The explosive force can vent itself through the slot 50. At the force on the piston body is relieved, the compressed liquid in the piston body expands, driving the piston body to the right. If the force is great enough, the piston body would make several reciprocations back and forth before it came to rest. However, since this would not be desirable in an airplane, the slot 50 is made long enough that the explosive force begins to vent and dissipate itself long before the piston body comes to the end of its working stroke, so that the spring can return the piston body without compression of the gases.

It has been found that a piston body with an overall length of approximately 6½ inches, when the piston rod 36 is in its expanded position shown in Fig. 5, and having a maximum diameter of 2.622 inches, with suitable compressible liquids, can absorb energy of up to 20,000 inch pounds. Such a liquid spring adds only 6 ounces to the weight of the ejecting mechanism and can do the work of a mechanical coil spring 8.5 inches in diameter made of wire of 1.75 inch gauge, 10 inches long, having five active coils, and weighing 57 pounds. It will be seen, therefore, that with the spring of the present invention the device becomes practical with a material saving in weight, and in space, which are extremely important items in airplane construction.

The graph of Fig. 9 shows the load capacity of the spring with one liquid. By using a more compressible liquid a higher preload and end load, and double the energy absorption has been achieved. The energy absorption is proportional to the area under the curve in the graph.

While the invention has been described in connection with its application to ejectors for bomb racks and auxiliary gasoline tanks for airplanes, it will be understood that it has wide application. It may be employed wherever it is desired to use a liquid spring on a reciprocable part that is intended to be moved some distance before the spring is energized. In effect, the invention provides a liquid spring having a piston reciprocable within a reciprocable piston into which the liquid spring is integrated.

While the invention has been described in connection, therefore, with a particular embodiment thereof, and a particular application therefor, it will be understood that it is capable of further modification and use, and this application is intended to cover any variations, uses, or adaptations of the invention following in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A device of the character described comprising a cylinder, a first piston reciprocable therein and adapted to be moved in one direction therein upon application of an outside force thereto, said first piston having a chamber therein filled with a compressible medium, a second piston reciprocable in said chamber, a stop in said cylinder at one end thereof, and a piston rod rigid with said second piston and projecting outwardly toward said stop through the end of said first piston, which faces said stop, whereby upon movement of said piston in said one direction said piston rod will engage said stop at the end of the travel of said first piston in said cylinder in said one direction to compress said compressible medium, so that upon release of said outward force, said compressible medium will expand to effect through said second piston movement of said first piston in the opposite direction.

2. A device of the character described comprising a first cylinder, a first piston reciprocable in said cylinder and having a second cylinder and a chamber formed therein, said second cylinder and said chamber communicating with one another, a second piston reciprocable in said second cylinder, a connecting rod having a bifurcated end provided with two ears disposed, respectively, at opposite sides of said second cylinder and said second piston, a pin pivotally connecting said ears to said first piston, said first piston being provided externally with two bearing seats disposed, respectively, at opposite sides of said second cylinder and said second piston and adapted to receive said ears, said bearing seats and said ears having mating concave and convex arcuate surfaces, respectively, curved about the axis of said pin, whereby said ears rest in bearing engagement against said bearing surfaces and transmit forces to and from said piston therethrough.

3. An actuating device of the character described comprising a first cylinder, a first piston reciprocable therein, said first piston having a second cylinder and a chamber therein communicating with one another and filled with a compressible medium, a second piston reciprocable in said second cylinder, a stop in said first cylinder, a member rigid with said second piston and projecting from said first piston in position to engage said stop as said first piston travels in one direction in said first cylinder, and a member pivotally connected to said first piston for connecting said first piston to a part which is to be actuated thereby.

4. An actuating device of the character described comprising a first cylinder, a first piston reciprocable therein, said first piston having a second cylinder and a chamber therein communicating with one another and filled with a compressible medium, a second piston reciprocable in said second cylinder, a stop in said first cylinder, a member rigid with said second piston and projecting from said first piston in position to engage said stop as said first piston travels in one direction in said first cylinder, and a member pivotally connected to said first piston for connecting said first piston to a part which is to be actuated thereby, said first cylinder having an axial slot therein through which the last-named member extends.

5. An actuating device of the character described comprising a first cylinder, a first piston reciprocable therein, said first piston having a second cylinder and a chamber therein communicating with one another and filled with a compressible medium, a second piston reciprocable in said second cylinder, a stop in said first cylinder, a member rigid with said second piston and projecting from said first piston in position to engage said stop as said first piston travels in one direction in said first cylinder, and a member pivotally connected to said first piston for connecting said first piston to a part which is to be actuated thereby, said first cylinder having an axial slot therein through which the last-named member extends, said slot being of greater axial length than the overall length of said first piston and the first-named member.

6. An actuating device of the character described comprising a cylinder, a first piston reciprocable in said cylinder and adapted to have a propellant force exerted against one end face thereof to drive said first piston in one direction in said cylinder, a second piston reciprocable in said first piston, resilient means normally urging said second piston in one direction in said first piston, a stop secured to said cylinder in position to be engaged by said second piston as said first piston travels in said one direction in said cylinder, and a rod pivotally connected to said first piston for connecting said first piston to a part which is to be actuated thereby, said connection comprising an ear on said rod, and a pin pivotally connecting said ear with said first piston, said ear having an arcuate peripheral surface concentric with the pivotal axis of said rod, and said first piston having a socket for receiving said ear, said socket having an arcuate surface into which the peripheral surface of said ear fits and which corresponds in shape to said peripheral surface.

7. An actuating device of the character described comprising a cylinder, a first piston reciprocable in said cylinder and adapted to have a propellant force exerted against one end face thereof to drive said piston in one direction in said cylinder, a second piston reciprocable in said first piston, resilient means normally urging said second piston in one direction in said first piston, a stop secured to said cylinder in position to be engaged by said second piston as said first piston travels in said one direction in said cylinder, and a rod pivotally connected to said first piston for connecting said first piston to a part which is to be actuated thereby, said connection comprising a pair of ears on said rod which straddle said second piston, and a pin pivotally connecting said ears with said first piston, said ears having arcuate peripheral surfaces concentric with the pivotal axis of said rod, and said first piston having sockets for receiving said ears which have arcuate surfaces corresponding in shape to said peripheral surfaces to fit and guide the same in the pivotal movement of said rod.

8. An actuating device of the character described comprising a cylinder, a first piston reciprocable in said cylinder and adapted to have a propellant force exerted against one end face thereof to drive said piston in one direction in said cylinder, a second piston reciprocable in said first piston, resilient means normally urging said second piston in one direction in said first piston, a stop secured to said cylinder in position to be engaged by said second piston as said first piston travels in said one direction in said cylinder, and a rod pivotally connected to said first piston for connecting said first piston to a part which is to be actuated thereby, said connection comprising a pair of ears on said rod which straddle said second piston, and a pin pivotally connecting said ears with said first piston, said ears having arcuate peripheral surfaces concentric with the pivotal axis of said rod, and said first piston having sockets for receiving said ears which have arcuate surfaces corresponding in shape to said peripheral surfaces to fit and guide the same in the pivotal movement of said rod, and said cylinder having a slot therethrough of greater axial length than the overall axial length of said first piston and through which said rod extends.

9. A device of the character described comprising a reciprocable piston having a cylinder therein filled with a compressible medium, a second piston reciprocable in said cylinder, an end plate closing said cylinder, said second piston having a portion rigid therewith which projects outwardly through a hole in said end plate, and a removable stop collar interposed between said end plate and said first piston and surrounding said projecting portion to limit the outward movement of said second piston in said cylinder.

10. An actuating device of the character described comprising a first cylinder, a first piston reciprocable therein, said first piston having a second cylinder and a chamber therein communicating with one another and filled with a compressible medium, a second piston reciprocable in said second cylinder, a stop secured to said first cylinder in position to be engaged by one of said pistons as said first piston moves in one direction in said first cylinder, and a connecting rod pivotally connected to said first piston and extending through an elongate axial slot in said first cylinder.

11. An actuating device of the character described comprising a first cylinder, a first piston reciprocable therein, said first piston having a second cylinder and a chamber therein communicating with one another and filled with a compressible medium, a second piston reciprocable in said second cylinder, and having a portion rigid therewith which projects outwardly beyond one end of said first piston, a stop secured in one end of said first cylinder in position to be engaged by one of said pistons as said first piston moves in one direction in said first cylinder, and a connecting rod pivotally connected to said first piston and extending through an elongate axial slot in said first cylinder.

12. An actuating device of the character described comprising a cylinder, a first piston reciprocable therein, said first piston having a second cylinder and a chamber therein communicating with one another and filled with a compressible medium, a second piston reciprocable in said second cylinder, and having a portion rigid therewith which projects outwardly beyond one end of said first piston, a stop secured in one end of said first cylinder in position to be engaged by one of said pistons as said first piston moves in one direction in said first cylinder, and a connecting rod pivotally connected to said first piston and extending through an elongate axial slot in said first cylinder, said slot being of greater length than the overall length of said two pistons when said portion is projecting outwardly to its maximum extent beyond said one end of said first piston.

13. An actuating device of the character described comprising a first cylinder, a first piston reciprocable therein, said first piston having a second cylinder therein filled with a compressible medium, a second piston reciprocable in said second cylinder, a stop secured to said first cylinder in position to be engaged by one of said pistons as said first piston moves in one direction in said first cylinder, and a connecting rod pivotally connected to said first piston and extending through an elongate axial slot in said first cylinder, the connection between said rod and said first piston comprising a pair of ears on said rod straddling said second piston, and a pin pivotally connecting said ears with said first piston, said ears having convex arcuate peripheral surfaces coaxial with the pivot axis of said rod and said first piston having sockets to receive said ears which are concave and corresponding in shape to said peripheral surfaces.

14. An actuating device of the character described comprising a first cylinder, a first piston reciprocable therein, said first piston having a second cylinder therein filled with a compressible medium, a second piston reciprocable in said second cylinder, and having a portion rigid therewith which projects outwardly beyond one end of said first piston, a stop secured in one end of said first cylinder in position to be engaged by one of said pistons as said first piston moves in one direction in said first cylinder, and a connecting rod pivotally connected to said first piston and extending through an elongate axial slot in said first cylinder, the connection between said rod and said first piston comprising a pair of ears on said rod straddling said second piston, and a pin pivotally connecting said ears with said first piston, said ears having convex arcuate peripheral surfaces coaxial with the pivot axis of said rod and said first piston having sockets to receive said ears which are concave and corresponding in shape to said peripheral surfaces.

15. An actuating device of the character described comprising a first cylinder, a first piston reciprocable therein, said first piston having a second cylinder therein filled with a compressible medium, a second piston reciprocable in said second cylinder, and having a portion rigid therewith which projects outwardly beyond one end of said first piston, a stop secured in one end of said first cylinder in position to be engaged by one of said pistons as said first piston moves in one direction in said first cylinder, and a connecting rod pivotally connected to said first piston and extending through an elongate axial slot in said first cylinder, said slot being of greater length than the overall length of said two pistons when said portion is projecting outwardly to its maximum extent beyond said one end of said first piston, the connection between said rod and said first piston comprising a pair of ears on said rod straddling said second piston, and a pin pivotally connecting said ears with said first piston, said ears having convex arcuate peripheral surfaces coaxial with the pivot axis of said rod and said first piston having sockets to receive said ears which are concave and corresponding in shape to said peripheral surfaces.

16. An actuating device of the character described comprising a first cylinder, a first piston reciprocable therein, said first piston having a second cylinder therein, a second piston reciprocable in said second cylinder, a compressible medium in said second cylinder constantly urging said second piston outwardly to project beyond one end of said first piston, a connecting rod, a pin pivotally connecting one end of said rod to said first piston, said rod being bifurcated at its connected end and having two spaced, parallel ears, said first piston having two bearing seats to receive said ears, said ears and seats being convexly and concavely curved, respectively, about the axis of said pin, said ears and seats being disposed, respectively, at opposite sides of a central plane passing axially through said second piston, and said pin extending transversely of said plane above said second piston.

References Cited in the file of this patent

UNITED STATES PATENTS

| 101,217 | Blake | Mar. 29, 1870 |
| 565,607 | Deport | Aug. 11, 1896 |
| 2,509,472 | Billeter | May 30, 1950 |
| 2,672,133 | Etchells | Mar. 16, 1954 |

FOREIGN PATENTS

| 105,053 | Great Britain | Mar. 21, 1917 |
| 50,838 | Norway | May 18, 1932 |